(12) United States Patent
Massetti et al.

(10) Patent No.: US 8,580,106 B2
(45) Date of Patent: Nov. 12, 2013

(54) PROCESS FOR THE TREATMENT OF OIL RESIDUES COMING FROM THE OIL INDUSTRY

(75) Inventors: Felicia Massetti, Castelnuovo di Porto (IT); Michelangelo D'Abbieri, Rome (IT); Alessandro Nardella, Rome (IT)

(73) Assignee: ENI S.p.A., Rome (IT)

( * ) Notice: Subject to any disclaimer, the term of this patent is extended or adjusted under 35 U.S.C. 154(b) by 382 days.

(21) Appl. No.: 12/936,125

(22) PCT Filed: Mar. 26, 2009

(86) PCT No.: PCT/IB2009/005121
§ 371 (c)(1),
(2), (4) Date: Dec. 20, 2010

(87) PCT Pub. No.: WO2009/122258
PCT Pub. Date: Oct. 8, 2009

(65) Prior Publication Data
US 2011/0100878 A1    May 5, 2011

(30) Foreign Application Priority Data
Apr. 3, 2008    (IT) .............. MI2008A0581

(51) Int. Cl.
*C10M 175/00*    (2006.01)
(52) U.S. Cl.
USPC ............ 208/179; 208/634; 208/323

(58) Field of Classification Search
USPC ............ 208/179
See application file for complete search history.

(56) References Cited

U.S. PATENT DOCUMENTS

| | | | |
|---|---|---|---|
| 4,812,225 A * | 3/1989 | Corti et al. ............ 208/13 |
| 5,080,721 A | 1/1992 | Flanigan et al. | |
| 5,092,983 A | 3/1992 | Eppig et al. | |
| 6,550,552 B1 | 4/2003 | Pappa et al. | |
| 2004/0144721 A1 | 7/2004 | D'Angeli et al. | |
| 2004/0204624 A1* | 10/2004 | Pappa et al. ............ 588/261 |

FOREIGN PATENT DOCUMENTS

| | | | |
|---|---|---|---|
| GB | 1 364 942 | | 8/1974 |
| IT | EP 2093199 | * | 8/2009 |

OTHER PUBLICATIONS

International Search Report issued Jul. 22, 2009 in PCT/IB09/05121 filed Mar. 26, 2009.

* cited by examiner

*Primary Examiner* — Randy Boyer
*Assistant Examiner* — Juan Valencia
(74) *Attorney, Agent, or Firm* — Oblon, Spivak, McClelland, Maier & Neustadt, L.L.P.

(57) ABSTRACT

The present invention relates to a process for the treatment of oil residues coming from the oil industry which comprises the recovery of the oil fraction of residues by extraction with solvents having a low environmental impact (ethyl acetate/toluene) and subsequent finishing for the downgrading of the residual material.

26 Claims, 1 Drawing Sheet

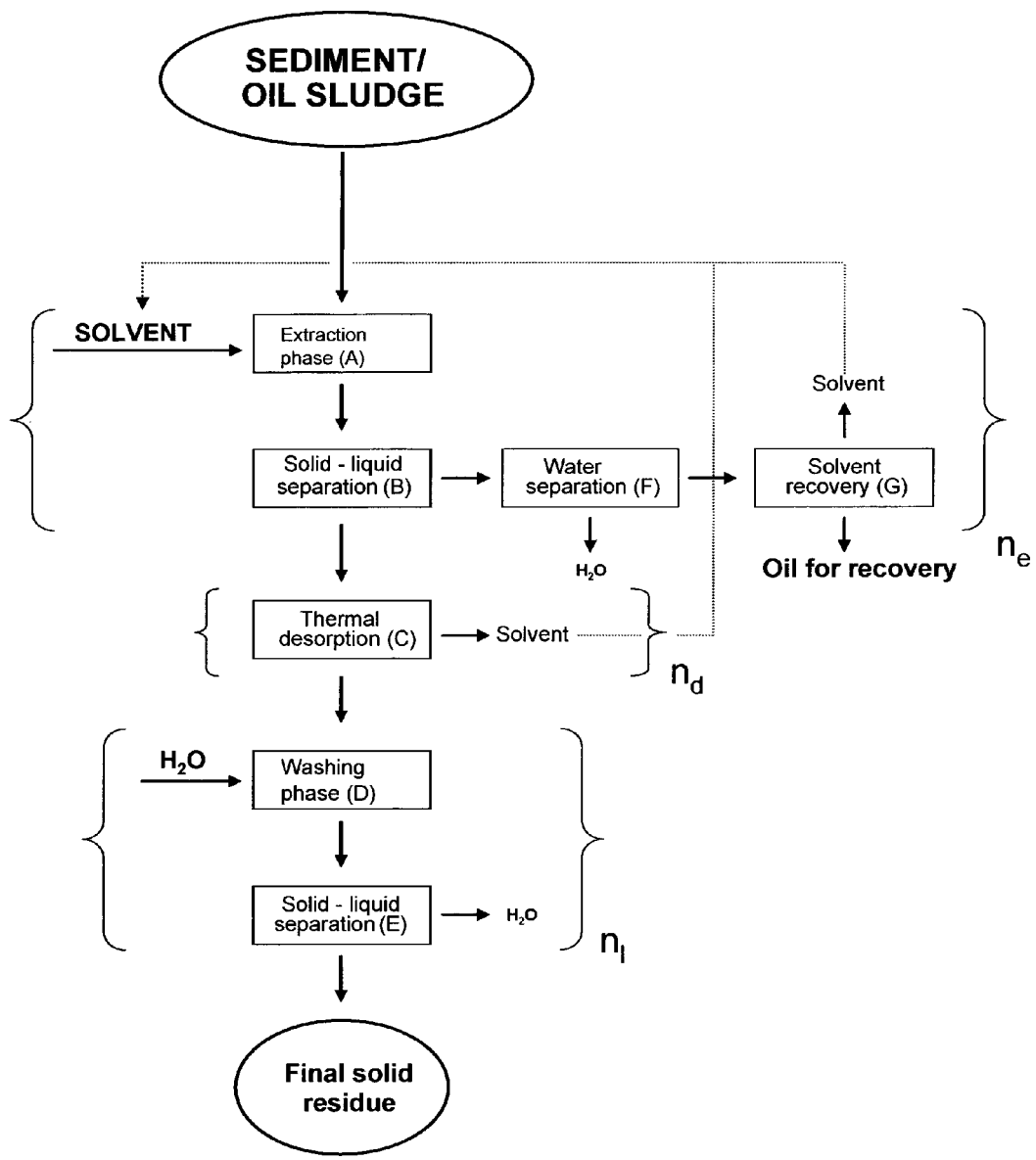

PROCESS FOR THE TREATMENT OF OIL RESIDUES COMING FROM THE OIL INDUSTRY

The present invention relates to a process for the treatment of oil residues coming from the oil industry.

More specifically, the invention relates to a process for the reduction, recovery and declassification of oil sludge and/or tank sediments produced by the oil industry and for the recovery of the oil components.

Waste-products deriving from the oil industry mainly consist of oil sludge coming from wastewater treatment plants (TAS), sediments coming from the reclamation of tanks containing crude oil, fuel oil, gas oil, etc., from the reclamation of plant equipment and oil residue accumulation basins or ponds.

These waste-products, depending on the origin of the material, have an oil content varying from 20 to 80%, a water content of 10 to 40% and a content of inert products ranging from 5 to 50%.

The national reference regulation for the classification of said waste-products is represented by the Directive of the Ministry for the Environment and Land Protection of Apr. 9, 2002 whose Annex A contains the list of waste-products (European Waste Catalogue) according to the Decision 2000/532/CE and subsequent modifications, in force since Jan. 1, 2002.

In this list, the types of waste-products which can be qualified as hazardous are marked by an asterisk * and are partly represented by isolated items (as the dangerousness is intrinsically linked to the origin of the waste-product), the remaining part is represented by "specular" items of non-hazardous waste-products (as the dangerousness is linked to the content of dangerous substances present in the waste-product).

The materials, object of the present invention belong to the waste generator category Nr. 05 00 00: "Waste from oil refining, purification of natural gas and pyrolitic treatment of coal", to the production process Nr. 05 01 00": "Oil Refining Waste" and are qualified as hazardous.

With respect to the final disposal of the waste-products, the Legislative Decree of Jan. 13, 2003 Nr. 36 and the relative Actuation Decree of the Ministry for the Environment and Land Protection of Aug. 3, 2005 concerning the admissibility criteria of waste-products in land dumps, with the aim of preventing or reducing to the maximum negative repercussions on the environment, introduce extremely more restrictive conditions for the disposal of waste-products in land dumps from the point of view of both the quantities, and the categories not admitted for this destination, with respect to both the limits on a series of analytical parameters among which the eluate of heavy metals and the DOC (Dissolved Organic Carbon) parameter, the latter being particularly critical due to the nature of the samples in question.

The intrinsic dangerousness of the waste-products, object of the present invention, also involves the obligation of examining the TOC (Total Organic Carbon) parameter on the sample as such, whose limit of 6%, which can be easily exceeded, makes it necessary to resort to suitable treatment aimed at extracting and recovering the oily fraction contained and stabilizing the solid phase obtained, so as to make it compatible with its disposal in controlled land dumps.

The necessity of treating these materials is therefore determined by both normative restrictions and also by opportunities of an economical nature.

The treatment so far developed has been mainly aimed at recovering the oil component, without specifically intervening however on the properties of the solid residue in terms of release characteristics.

The recovery of the oil contained in these residues is often effected by resorting to treatment of the thermal type, as described for example in patents U.S. Pat. No. 3,716,474S, EP 022353A1, EP 0330314A1, WO9204424, CN1178777A, EP 1577367A1, with the disadvantage of having to consume energy for removing the aqueous fraction and resort to relatively high temperatures to be able to recover the high-boiling components of which the oil fraction consists.

The treatment described in U.S. Pat. No. 5,288,391 uses biodegradable solvents for treating refinery residues, recycling the oil recovered to the refinery, but obtaining a residue which must be treated biologically or used as fuel.

Another treatment approach consists in separating the oil from the solids by means of filtration, as described for example in BE 864352, possibly with the use of additives, as described in EP 0614689A2, where the solid, before being sent for disposal, is treated by extraction with a solvent or by vapour stripping treatment. The separation of the phases starting from the stable system consisting of solid-oil-water, is also obtained with the help of chemical agents such as surface-active agents (JP 59112808A), possibly assisted by additives and solvents (U.S. Pat. No. 5,897,767), with the problem of having to subsequently effect the recovery or treatment of the chemicals used.

A thermal/oxidative treatment is also described (WO9925497) which, by used hydrogen peroxide, in addition to recovering the oil, tends to oxidize toxic compounds such as aromatic polycyclic hydrocarbons, this treatment however has the risk of leading to the formation of undesired oxidation compounds.

A process has now been found, which allows the oil residues to be economically and effectively treated by extraction of the oil fraction with solvents having a low environmental impact and subsequent finishing for the declassification of the residual material.

The process is not influenced by the content of water, solids and oil or by the composition of the oil and allows over 90% of oil to be recovered, having a quality which is such as to allow it to be conveniently recycled to the refinery. A residue is also obtained, consisting of deoiled solids with such characteristics as to allow it to be disposed of as a non-hazardous waste-product. The water separated from the process is compatible with the refinery water treatment plants.

The process therefore provides a double advantage: the recovery of the oil and detoxification of the solid residue.

A further advantage obtained is the weight reduction of the waste-product to be sent for disposal.

In accordance with this, an object of the present invention relates to a process for the treatment of oil residues coming from the oil industry comprising, with reference to FIG. 1:

(i) sending the oil residue to an extraction phase (A) by mixing with a solvent, for the recovery of the oil component;

(ii) sending the mixture of oil residues-solvent to a solid-liquid separation phase (B) and collecting a supernatant and a solid fraction;

(iii) sending the supernatant separated in phase (B) to a thermal recovery phase (G) of the oil and solvent used for the extraction, and recycling the same to the process;

(iv) sending the solid fraction separated in phase (B) to a washing phase (D) by mixing with water;

(v) sending the solid fraction-water mixture of the washing phase (D) to a solid-liquid separation phase (E) and collecting an aqueous supernatant and a final solid residue.

The washing phase (D) allows both the removal of the residual solvent and the extraction of the polar compounds present in the oil component.

Downstream of the extraction with the solvent, before washings with water, a low-temperature thermal desorption step (C) can be inserted for recovering the extraction solvent from the solid.

The aqueous component of the residue possibly extracted is separated from the extraction solvent by sedimentation (F).

The solid/liquid separation (B), (E) takes place by centrifugation, cycloning, or by sedimentation.

The solvents used can consist of either hydrocarbon fractions, pure or in a mixture, such as for example fractions consisting of aromatic solvents with a boiling point ranging from 100 to 140° C., or solvents characterized by a greater polarity such as ethyl acetate or acetone, pure or in a mixture, or a combination of said solvents.

In the preferred configuration, the apolar solvent consists of toluene, the polar solvent of ethyl acetate. The extraction and solid-liquid washing ratio varies from 1:0.5 to 1:10 by weight and, preferably, from 1:1 to 1:5. The contact time with the solvent and the washing time with water varies from 5 to 60 minutes, and preferably from 10 to 30'.

The extraction steps with a solvent, $n_e$, and washing with water, $n_1$, can vary from 1 to 10, generally being 2-3.

The recovery of the solvent takes place by evaporation at 50-150° C., 0.01-1 atm, and preferably at 60-90° C. and 0.1-0.8 atm.

If the solid deoiled material is characterized by the presence of leachable metals, during the washing with water, reagents can be added, capable of stabilizing said metals, such as compounds containing $S°$ or $S^{2-}$, such as for example sulfides and polysulfides.

Said washing is preferably effected using the same procedure described above, with contact times between the solid residue and the solution containing sulfide or polysulfide, varying from 30 minutes to 24 h, preferably 2-8 hours.

The concentration of reagents based on $S°$ or $S^{2-}$ can vary from 0.01 to 5% in water, and preferably ranges from 0.05 to 2%. The washing with the solution of $S°$ or $S^{2-}$ is followed by 1-10 washings with water, preferably 1-2, with the procedure described above.

The use of organic solvents having a different polarity, possibly followed by washings with water, offers the advantage of both recovering high percentages of oil, which can be reused in the refinery, and also of removing the polar organic components possibly present in the residue, which can be strongly jeopardized in relation to the disposal options of the same.

One of the parameters which determine the disposal options of a waste-product, in fact, consists of the quantity of organic carbon that this releases in water.

As the process also envisages the extraction of polar compounds, it reduces the quantity of leachable organic carbon from the waste-product, allowing it to be disposed of as non-hazardous according to the legislation in force.

Some examples are now provided, which represent applications of the present invention, which should not be considered as limiting the same.

EXAMPLE 1

Treatment of Tank Sediments with Toluene

A sample of tank sediment was first characterized in terms of oil content, water and inert products.

The oil proved to be equal to 67.4%, the water 17.6% and the inert products 15.0%.

The sample was extracted with toluene in the proportions (weight/weight) sediment:toluene=1:3, under stirring×15' to favour the extraction of the oil fraction on the part of the solvent. The solid-liquid separation was then effected with the use of a centrifuge operating at 3,000 r×20'.

The water content was determined on the supernatant, which is separated in a separator funnel (proving to be equal to 1.8%), and the oil content, extracted by weighing the boiler deposit deriving from the distillation of the toluene at 80° C. at 0.8 atm in a rotating evaporator (equal to 16.2%).

The solid residue separated by the centrifugation was treated with the same procedure as the first extraction step, undergoing a further 2 mixing and centrifugation steps for each of which the water content was re-determined (1.4% at the $2^{nd}$ step and 0.6% at the $3^{rd}$ step) together with the oil content (1.4%, at the $2^{nd}$ step and 0.2% at the $3^{rd}$ step) extracted from the supernatant. The final solid residue downstream of the third extraction step was dried in an oven at 110° C. to remove the toluene contained therein and was subsequently washed by mixing with water×15' in a residue:water weight ratio=1:3. The mixture was centrifuged at 3,000 r×20' and the solid residue subjected to a further two analogous washings with water. An analytical characterization according to DM Mar. 8, 2005 was effected on the final solid residue of the treatment, determining the TOC parameter on the material as such, which proved to be equal to 4.6% (lower than the 5% limit for disposal in land dumps for non-hazardous wasteproducts) and effecting the leaching test according to the regulation UNI 10802 for measuring the DOC parameter on the eluate, which proved to be equal to 36 mg/l (lower than 80 mg/l the limit for disposal in land dumps for non-hazardous waste-products) and heavy metals, whose values, indicated in the following table, all proved to be lower than the specification limits, except for the mercury.

| | Metals (µg/l) | | Example |
|---|---|---|---|
| analyte | ref. limit np | ref. limit P | 1 |
| As | 200 | 2500 | 35 |
| Ba | 10000 | 30000 | 0.3 |
| Cd | 20 | 200 | 2 |
| Cr tot | 1000 | 7000 | 5 |
| Cu | 5000 | 10000 | 4.7 |
| Hg | 5 | 50 | 65.6 |
| Mo | 1000 | 3000 | 6 |
| Ni | 1000 | 4000 | 668.4 |
| Pb | 1000 | 5000 | 15.7 |
| Sb | 70 | 500 | 1.7 |
| Se | 50 | 700 | <50 |
| Zn | 5000 | 20000 | 160.9 |

The whole treatment allows an oil recovery of about 91% and a reduction in the material to be disposed of, of about 66%.

EXAMPLE 2

Treatment of Tank Sediment with Toluene+$Na_2S$

In order to stabilize the leaching of the metal mercury to lower its concentration in the eluate within specification limits, the final solid residue downstream of the third extraction step and drying in an oven at 110° C. according to example 1, was washed with a solution of sodium sulfide at 0.1%×8 hours in a solid:liquid weight ratio of 1:3. The mixture was centrifuged at 3,000 r×20' and the solid residue was subjected to a further two washings with water for a mixing time of 15' in the same residue:water weight ratio=1:3. The leaching test was effected again on the final solid residue of the treatment for measuring the metals on the eluate, whose values, indicated in the following table, all proved to be lower than the specification limits.

| Metals (µg/l) | | | Example |
|---|---|---|---|
| analyte | ref. limit np | ref. limit P | 2 |
| As | 200 | 2500 | 35 |
| Ba | 10000 | 30000 | 12.1 |
| Cd | 20 | 200 | 2.7 |
| Cr tot | 1000 | 7000 | 5.3 |
| Cu | 5000 | 10000 | 4.1 |
| Hg | 5 | 50 | 2.5 |
| Mo | 1000 | 3000 | 70.3 |
| Ni | 1000 | 4000 | 442.2 |
| Pb | 1000 | 5000 | 31.2 |
| Sb | 70 | 500 | 21.1 |
| Se | 50 | 700 | <50 |
| Zn | 5000 | 20000 | 33.3 |

EXAMPLE 3

Treatment of TAS Oil Sludge with Ethyl Acetate

A sample of oil sludge was first characterized in terms of content of oil, water and inert products.

The oil proved to be equal to 23.1%, the water 28.0% and the inert products 48.9%; in addition, the content of dry substance was determined, as a complement to 100 of the weight loss at 105° C., which proved to be equal to 63.1%, and the content of volatile substance at 550° C. which proved to be equal to 23.8%. An analytical characterization was also effected according to the DM Mar. 8, 2005, by carrying out the leaching test according to the regulation UNI 10802 for measuring the eluate of the DOC parameter, which proved to be higher than 100 mg/l (limit for granting the disposal of waste-products in land dumps): in order to be disposed of in land dumps, the material must therefore undergo suitable treatment.

The sample was extracted with ethyl acetate in the proportions (weight/weight) sludge:ethyl acetate=1:3 under stirring×15' to favour the extraction of the oil fraction on the part of the solvent. The slurry was then subjected to solid-liquid separation with the use of a centrifuge operating at 3,000 r×20'.

The content of water which is separated in a separator funnel was then determined on the supernatant (equal to 0.0%) and the content of oil extracted by weighing the boiler deposit deriving from the distillation of ethyl acetate at 80° C. at 0.6 atm in a rotating evaporator (which proved to be equal to 6.9%).

The solid residue separated by the centrifugation was treated with the same procedure used in the first extraction step undergoing a second mixing and centrifugation step for which the water content (0.0%) and oil content (0.5%) extracted from the supernatant was re-determined. The solid residue was then dried in an oven at 105° C. to remove the ethyl acetate contained therein and was subsequently washed by mixing with water×15' in a residue:water weight ratio=1:3. The mixture was centrifuged at 3,000 r×20' and the solid residue underwent an analogous washing with water.

An analytical characterization according to DM Mar. 8, 2005 was effected on the final solid residue of the treatment, determining the TOC parameter on the material as such, which proved to be equal to 4.8% (lower than the 5% limit for disposal in land dumps for non-hazardous waste-products) and effecting the leaching test according to the regulation UNI 10802 for measuring the DOC parameter on the eluate, which proved to be equal to 62 mg/l (lower than 80 mg/l, the limit for disposal in land dumps for non-hazardous waste-products) and heavy metals, whose values, indicated in the following table, all proved to be lower than the specification limits.

| Metals | | | Example |
|---|---|---|---|
| analyte | ref. limit np | ref. limit P | 3 |
| As | 200 | 2500 | 35 |
| Ba | 10000 | 30000 | 304.5 |
| Cd | 20 | 200 | 2.7 |
| Cr tot | 1000 | 7000 | 5.3 |
| Cu | 5000 | 10000 | 63.9 |
| Hg | 5 | 50 | 2 |
| Mo | 1000 | 3000 | 625.7 |
| Ni | 1000 | 4000 | 88.8 |
| Pb | 1000 | 5000 | 31.2 |
| Sb | 70 | 500 | 21.1 |
| Se | 50 | 700 | <50 |
| Zn | 5000 | 20000 | 15.8 |

The whole treatment allows an oil recovery of about 97% with a slight increase in the material to be disposed of, equal to about 7%.

The invention claimed is:

1. A process for the treatment of oil residues having an oil content of from 20 to 80% by weight comprising:
    (i) sending the oil residue to an extraction phase (A) by mixing with a solvent, for the recovery of the oil component;
    (ii) sending the mixture of oil residues-solvent to a solid-liquid separation phase (B) and collecting a supernatant and a solid fraction;
    (iii) sending the supernatant separated in phase (B) to a thermal recovery phase (G) of the oil and solvent used for the extraction, and recycling the same to the process;
    (iv) sending the solid fraction separated in phase (B) to a washing phase (D) by mixing with water;
    (v) sending the solid fraction-water mixture of the washing phase (D) to a solid-liquid separation phase (E) and collecting an aqueous supernatant and a final solid residue.

2. The process according to claim 1, wherein before the washing phase with water (D) of the solid fraction, a low-temperature thermal desorption step (C) is inserted for the recovery of the extraction solvent from the solid.

3. The process according to claim 1, wherein the aqueous component of the oil residue possibly extracted with the solvent and contained in the supernatant of step (ii), is separated from the extraction solvent by sedimentation (F).

4. The process according to claim 1, wherein the oil residues consist of oil sludge and/or tank sediments.

5. The process according to claim 1, wherein the solid/liquid separation phases (B), (E) are effected by centrifugation, cylconing, or by sedimentation.

6. The process according to claim 1, wherein the solvent used for the extraction is selected from aromatic solvents with a boiling point ranging from 100 to 140° C., ethyl acetate, acetone or a combination of said solvents.

7. The process according to claim 6, wherein the solvent used for the extraction is selected from toluene, ethyl acetate or a combination of the two.

8. The process according to claim 1, wherein the extraction phase (A) with the solvent and the washing phase (D) with water are effected with a solid-liquid extraction and washing ratio which varies from 1:0.5 to 1:10 by weight.

9. The process according to claim 8, wherein the solid-liquid extraction and washing ratio varies from 1:1 to 1:5 by weight.

10. The process according to claim 1, wherein the extraction phase (A) and the washing phase (D) are effected under stirring, with a contact time with the solvent and a washing time with water ranging from 5 to 60 minutes.

11. The process according to claim 10, wherein the contact time with the solvent and the washing time with water range from 10 to 30 minutes.

12. The process according to claim 1, wherein the extraction steps with a solvent and washing steps with water, vary from 1 to 10.

13. The process according to claim 12, wherein there are from 2 to 3 extraction steps with a solvent and washing steps with water.

14. The process according to claim 1, wherein the thermal recovery phase (G) of the solvent takes place by evaporation at 50-150° C. and 0.01-1 atm.

15. The process according to claim 1, wherein the thermal recovery phase (G) of the solvent takes place by evaporation at 60-90° C. and 0.1-0.8 atm.

16. The process according to claim 1, wherein sulfides and polysulfides are added to the water of the washing phase (D).

17. The process according to claim 16, wherein the washing is effected with contact times between the solid fraction and the solution containing sulfide or polysulfide, ranging from 30 minutes to 24 h.

18. The process according to claim 17, wherein the washing is effected with contact times ranging from 2-8 h.

19. The process according to claim 16, wherein the concentration of sulfides and polysulfides in water varies from 0.01 to 5%.

20. The process according to claim 19, wherein the concentration of sulfides and polysulfides in water varies from 0.05 to 2%.

21. The process according to claim 16, wherein the washing steps with water containing additives vary from 1-10.

22. The process according to claim 21, wherein there are one or two washing steps with water containing additives.

23. A process for treating an oil residue comprising from 20 to 80% by weight of oil, said process comprising:
mixing the oil residue with a solvent comprising toluene to form an oil residue-solvent mixture;
separating a solid fraction and a supernatant liquid fraction from the oil residue-solvent mixture;
thermally treating the supernatant liquid fraction to recover a solvent fraction and an oil fraction, and recyling the solvent fraction to the mixing;
washing the solid fraction with water to form a solid fraction-water mixture;
subjecting the solid fraction-water mixture to a solid-liquid separation to form an aqueous supernatant fraction and a final solid residue fraction.

24. The process according to claim 1, wherein the oil residue consists of an oil phase and a solid phase.

25. The process according to claim 1, wherein the solvent in the mixing consists of organic solvents.

26. The process according to claim 1, further comprising:
before the (i) sending, reclaiming the oil residues as a sediment from at least one of a crude oil tank, a fuel oil tank and a gas oil tank.

* * * * *